March 24, 1925.　　　　　　　　　　　　　　　　1,531,056
F. A. WILSON
ELASTIC TIRE
Filed March 21, 1924　　　2 Sheets-Sheet 1

Fig. 2ª

Inventor
Frederick Alfred Wilson
By
Pennie, Davis, Marvin & Edmonds
Attorneys

March 24, 1925.  1,531,056

F. A. WILSON

ELASTIC TIRE

Filed March 21, 1924  2 Sheets-Sheet 2

Patented Mar. 24, 1925.

1,531,056

UNITED STATES PATENT OFFICE.

FREDERICK ALFRED WILSON, OF LONDON, ENGLAND.

ELASTIC TIRE.

Application filed March 21, 1924. Serial No. 700,801.

*To all whom it may concern:*

Be it known that I, FREDERICK ALFRED WILSON, a British subject, residing at London, England, have invented certain new and useful Improvements in Elastic Tires; and I do hereby declare the following to be a full, clear, and exact description of the invention, such as will enable others skilled in the art to which it appertains to make and use the same.

This invention relates to road vehicle elastic tires of the kind in which the load-supporting side walls of the tire are of gable-like section which becomes distorted under load, and the object of the invention is to render such tires more suitable for comparatively light motor or other road vehicles, and to provide an improved tire structure.

According to the present invention the gable-like side-walls are formed with series of interspaced recesses or depressions of suitable shape, both upon their internal faces and upon their external faces, the depth of these depressions being for example approximately one-half of the thickness of the walls.

The adjacent depressions or recesses in each wall are spaced apart at intervals which allow between them a distance preferably not less than the circumferential length of the depressions. The depressions or recesses in the inner face of one wall are spaced alternately between those in the outer face of the same wall, and similarly the depressions in one side wall are preferably spaced alternately of those in the other wall.

The recesses or depressions are with advantage of semi-ovoid shape, being deeper and broader towards the tread, and shallower and narrower towards the base.

The invention is hereafter described with reference to the accompanying drawings, in which:—

Figure 1:
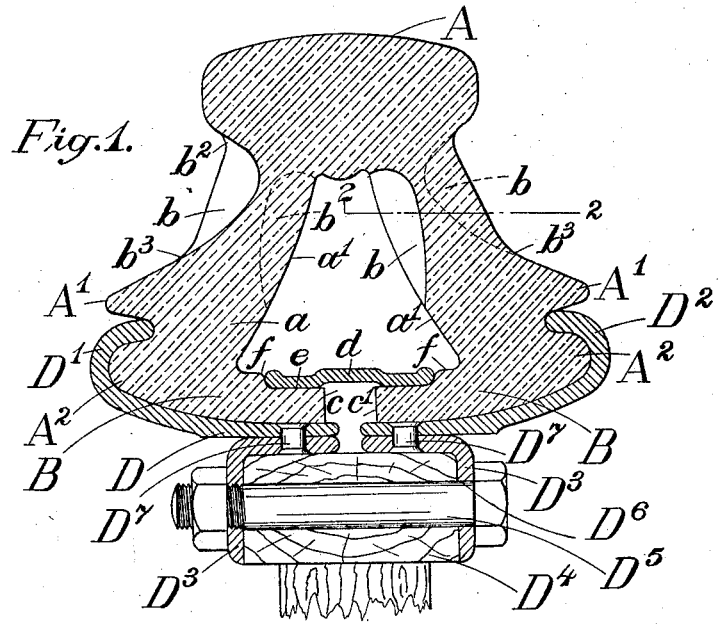
Figure 1 is a cross section of a tire made in accordance with the present invention and shows the recesses or depressions moulded in the side-walls of the tire, which is mounted upon a demountable rim of suitable construction.
Figure 2:
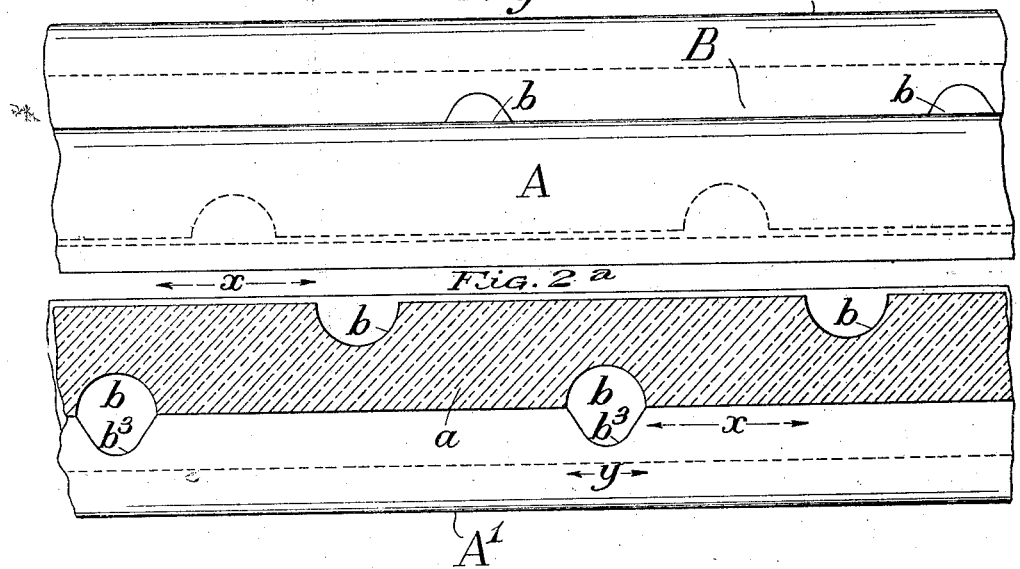
Figure 2 is a plan of one-half of the tire illustrated in Figure 1.

Figure 2ª is a view, partially in plan and partially in section, taken on the line 2—2 of Figure 1.

Figure 3:
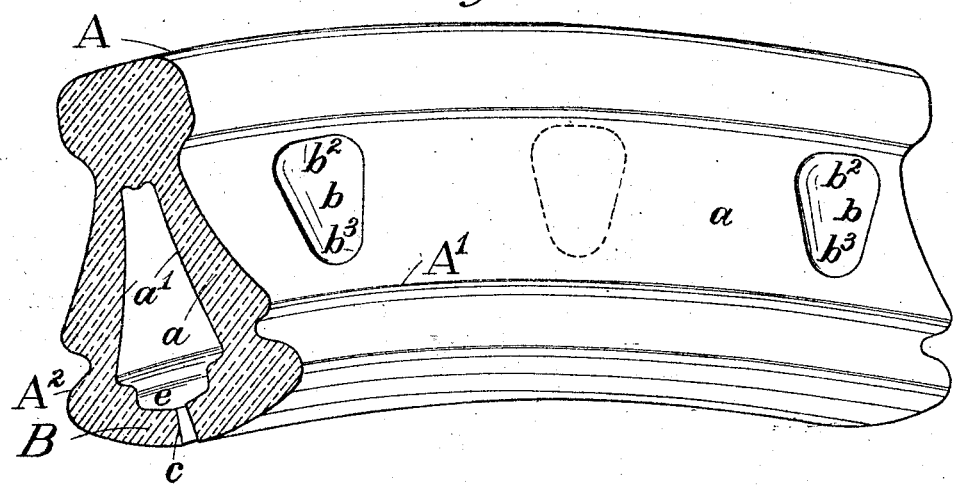

Figure 3 is a fragmentary perspective view of the tire alone.

The tire has the side-walls $a$ of its gable-like section formed with recesses or depressions $b$; these side-walls connect together the curved tread A and the base B, and are shown with the inner faces of the side-walls moulded to a convex shape at $a^1$. The tire is shown provided with outer beads $A^1$ and inner beads $A^2$, the latter being designated hooking base beads whereby the base of the tire may be engaged by the clinches $D^1$ $D^2$ of the wheel rim D. The recesses $b$ are preferably arranged alternately on the outside and on the inside of the side-wall, and between the recesses $b$ a portion of the wall remains of full width (see Figure 2ª), this portion being of a circumferential length not less but preferably rather greater than that of the recesses, as indicated by the respective distances $x$ and $y$ in Figure 2ª. In fact, under the tread there may be said to be a series of rectangular rubber pillars of length $x$, joined together by fluted rubber webs of the length $y$. The recesses $b$ on the opposite side-wall of the tire come in the centre of the solid parts or pillars in the first side-wall, as seen by comparison of Figures 2 and 2ª. The recesses $b$ may be of any suitable shape and cross-section; preferably, as seen in Figure 3, they are semi-ovoid, being deeper and broader towards the tread A and shallower and narrower towards the base B.

The outer and inner shelving ends of the recesses or depressions $b$ on the outer faces of the side-walls merge into the adjacent portions of the tire, the former ends $b^2$ being tangential to the curve at the root of the tread A, and the opposite ends $b^3$ being continuous with the face of the outer bead $A^1$ of the tire as seen in Figure 1. The recesses or depressions on the inner faces of the side-walls are of similar shape.

The recesses $b$ allow of the lateral spewing of the rubber in the walls of the tire on deformation under compression, but if the recesses were formed on only one side of the wall, there would be on the other side a continuous wall of rubber which on deformation would not have the same facilities for spewing, and consequently uniformity of action would not be obtained; it has therefore been found highly desirable to provide recesses $b$ on both sides of the walls $a$ as now disclosed and shown.

The recesses $b$ being at $b^2$ broader and deeper near the tread A than at $b^3$ near the base B of the tire, the connecting walls or webs left by them are thinner near the tread, and similarly the pillars x which they connect are narrower and of smaller sectional area near the tread A than near the base B; in other words the pillars x and their connecting webs y just under the tread A are of smaller sectional area and are more sensitive to deformation than towards the base B of the tire, becoming less sensitive as they approach the base B.

The base B of the tire is shown provided with inwardly directed and facing edges $c$ $c^1$ which extend inwardly of the hollow tire beyond the ends of the side-walls nearest to the annular rim D. This rim is shown divided circumferentially and it comprises the clinches $D^1$ $D^2$, each half being shown secured, as by rivets $D^7$, to an annular face-plate $D^3$, the two face-plates $D^3$ being adapted to be secured to the wheel felloe $D^4$ by means of transverse bolts, as $D^5$, secured at intervals around the felloe and passing through holes $D^6$ in the face-plates $D^3$. An endless metal retaining rim $d$ is floated on the edges $c$ $c^1$ inside the tire base B before fitting the tire over the wheel felloe and before securing the second of the retaining clinches $D^1$ $D^2$ in position on the corresponding hooking base bead $A^2$. The retaining rim $d$ rests in a groove $e$ the edges of which are separated from the convexity $a^1$ of each side-wall by a circumferential rib $f$.

As a result of this method of construction the carrying power of the tire is not weakened in full proportion to the reduction of area of rubber, and further there is obtained a structure or backing behind the tread A which will yield readily and sensitively to light loads but offers greater and greater resistance to deformation as the load continues to increase.

The tire is therefore better adapted for carrying comparatively light loads at higher speeds, without any liability to rolling or lateral deflection in relation to the wheel.

It will be understood that a similar effect can be obtained by the provision of suitable excrescences upon the faces of the tire-walls, such excrescences being the converse of the recesses previously mentioned, and the two terms being in fact merely relative.

The tire-base B is shown in Figure 1, secured upon the wheel by means of the lateral clinches $D^1$ $D^2$ and of the endless rim $d$, but other well-known tire-securing means may be employed.

Having thus described my invention, what I claim is:—

1. In elastic tires of gable-like section for road vehicle wheels, the improvement which consists in forming the load-supporting side-walls of the tire with series of interspaced recesses, both upon their internal faces and upon their external faces.

2. An elastic tire of gable-like section, comprising a tread, a base portion, and side walls connecting said tread and base, said side walls having a series of interspaced recesses upon their external faces and a second series of interspaced recesses upon their internal faces, and each said series of recesses being spaced apart at intervals which allow between recesses on the same side wall a distance not less than the circumferential length of the depressions.

3. An elastic tire of gable-like section, comprising a tread, a base portion, and side walls connecting said tread and base, said side walls having a series of interspaced recesses upon their external faces and a second series of interspaced recesses upon their internal faces, and each series of interspaced recesses being so arranged that the recesses in the face of one side wall alternate between those in the other face of the same side wall.

4. An elastic tire of gable-like section, comprising a tread, a base portion, and side walls connecting said tread and base, each of said side walls having a series of interspaced recesses upon its external face and a second series of interspaced recesses upon its internal face, and said series of recesses being so spaced in one side wall that they alternate between those in the other side wall of the tire.

5. A hollow elastic tire for vehicles, comprising a tread portion, a base portion, and side walls connecting said tread and base portions, each of said side walls having series of recesses upon both its internal face and its external face, said recesses in each side wall being spaced apart at intervals which allow between them a distance not less than the circumferential length of the recesses, said recesses and in each side wall upon the internal and external faces of that wall being separated by wall-portions of the full sectional width of the wall and of a circumferential length not less than that of either of the adjacent recesses.

6. A hollow elastic tire for vehicles, comprising a tread, a base portion, and side walls connecting said tread and base portions, each of said side walls having interspaced recesses upon its external and internal faces, and said recesses being of semi-ovoid shape and deeper and broader towards the tread, and shallower and narrower towards the base.

7. A hollow elastic tire for vehicle wheels, comprising a curved tread portion, a base portion with beaded edges, side walls connecting said tread and base portions, each of said side walls having interspaced recesses upon its external and internal faces, said recesses being of semi-ovoid shape with their deeper and broader ends towards the tread, the recesses upon the external faces of said side walls having their outer and inner shelving ends merging into the adjacent portions of the tire, each of said outer ends being tangential to the curve at the root of the tread and each of said inner shelving ends being aligned and continuous with the face of the outer bead of the tire.

8. As a new article of manufacture, a hollow elastic tire for a road vehicle wheel, comprising a tread, a base portion, inwardly directed and facing edges to said base portion, and side walls connecting said tread and base portions, said side walls having interspaced recesses upon their inner faces and also interspaced recesses upon their outer faces, the inner and outer recesses on each side wall being staggered, and the alternate recesses being separated by circumferential lengths of side wall which are greater than the circumferential length of the recesses.

In testimony whereof I affix my signature.

FREDERICK ALFRED WILSON.